US008175882B2

(12) United States Patent
Basson et al.

(10) Patent No.: US 8,175,882 B2
(45) Date of Patent: May 8, 2012

(54) METHOD AND SYSTEM FOR ACCENT CORRECTION

(75) Inventors: Sara H. Basson, White Plains, NY (US); Dimitiri Kanevsky, Ossining, NY (US); Edward E. Kelley, Wappingers Falls, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 12/019,709

(22) Filed: Jan. 25, 2008

(65) Prior Publication Data

US 2009/0192798 A1 Jul. 30, 2009

(51) Int. Cl.
 *G10L 21/00* (2006.01)
(52) U.S. Cl. ........ 704/270; 704/234; 704/237; 704/239; 704/E11.001; 434/156; 434/157; 434/167; 434/185
(58) Field of Classification Search ................ 704/9–10, 704/234, 237, 239, 270, E11.001; 434/156, 434/157, 167, 185
See application file for complete search history.

(56) References Cited

U.S. PATENT DOCUMENTS

| | | | | |
|---|---|---|---|---|
| 5,393,236 A * | 2/1995 | Blackmer et al. | ............. | 434/169 |
| 5,754,978 A * | 5/1998 | Perez-Mendez et al. | ..... | 704/255 |
| 5,832,063 A * | 11/1998 | Vysotsky et al. | ......... | 379/88.03 |
| 5,897,616 A * | 4/1999 | Kanevsky et al. | ............ | 704/246 |
| 5,995,932 A * | 11/1999 | Houde | ........................... | 704/261 |
| 6,226,611 B1 * | 5/2001 | Neumeyer et al. | ............ | 704/246 |
| 6,249,763 B1 * | 6/2001 | Minematsu | .................... | 704/252 |
| 6,526,380 B1 * | 2/2003 | Thelen et al. | ................. | 704/251 |
| 6,823,312 B2 * | 11/2004 | Mittal et al. | ................... | 704/271 |
| 7,124,082 B2 | 10/2006 | Freedman | | |
| 7,292,979 B2 * | 11/2007 | Karas et al. | .................... | 704/244 |
| 7,539,296 B2 * | 5/2009 | Basson et al. | ............ | 379/265.12 |
| 2001/0029455 A1 * | 10/2001 | Chin et al. | ..................... | 704/277 |
| 2002/0086269 A1 * | 7/2002 | Shpiro | .......................... | 434/156 |
| 2002/0107695 A1 * | 8/2002 | Roth et al. | ..................... | 704/275 |
| 2002/0115044 A1 * | 8/2002 | Shpiro | .......................... | 434/156 |
| 2002/0184022 A1 * | 12/2002 | Davenport | ..................... | 704/247 |
| 2003/0039948 A1 * | 2/2003 | Donahue | ....................... | 434/322 |
| 2003/0115053 A1 * | 6/2003 | Eide et al. | ..................... | 704/231 |
| 2003/0125940 A1 * | 7/2003 | Basson et al. | ................. | 704/231 |
| 2003/0144837 A1 * | 7/2003 | Basson et al. | ................. | 704/231 |
| 2004/0006468 A1 * | 1/2004 | Gupta et al. | ................... | 704/254 |
| 2004/0049391 A1 * | 3/2004 | Polanyi et al. | ................ | 704/271 |
| 2004/0153319 A1 * | 8/2004 | Yacoub | .......................... | 704/240 |
| 2005/0065789 A1 * | 3/2005 | Yacoub et al. | ................. | 704/231 |
| 2005/0175970 A1 * | 8/2005 | Dunlap et al. | ................ | 434/185 |
| 2006/0057545 A1 | 3/2006 | Mozer et al. | | |
| 2006/0067508 A1 * | 3/2006 | Basson et al. | ............ | 379/265.12 |
| 2006/0110711 A1 * | 5/2006 | Julia et al. | ..................... | 434/156 |

(Continued)

OTHER PUBLICATIONS

Hincks. "Speech technologies for pronunciation feedback and evaluation" 2003.*

(Continued)

*Primary Examiner* — Richemond Dorvil
*Assistant Examiner* — Greg Borsetti
(74) *Attorney, Agent, or Firm* — Cantor Colburn LLP

(57) ABSTRACT

A method for task execution improvement, the method includes: generating a baseline model for executing a task; recording a user executing a task; comparing the baseline model to the user's execution of the task; and providing feedback to the user based on the differences in the user's execution and the baseline model.

8 Claims, 5 Drawing Sheets

U.S. PATENT DOCUMENTS

| | | | |
|---|---|---|---|
| 2006/0110712 A1* | 5/2006 | Julia et al. | 434/156 |
| 2006/0111902 A1* | 5/2006 | Julia et al. | 704/236 |
| 2006/0155538 A1* | 7/2006 | Higgins et al. | 704/246 |
| 2006/0161434 A1* | 7/2006 | Faisman et al. | 704/246 |
| 2007/0088547 A1 | 4/2007 | Freedman | |
| 2007/0198261 A1* | 8/2007 | Chen | 704/240 |
| 2007/0248938 A1* | 10/2007 | Ronald | 434/178 |
| 2009/0004633 A1* | 1/2009 | Johnson et al. | 434/169 |
| 2009/0239201 A1* | 9/2009 | Moe | 434/157 |
| 2010/0304342 A1* | 12/2010 | Zilber | 434/157 |

OTHER PUBLICATIONS

Bain et al. "Accessibility, transcription, and access everywhere" 2005.*

Zinovjeva. "Use of Speech Technology in Learning to Speak a Foreign Language" 2005.*

Neri et al. "ASR-based corrective feedback on pronunciation: does it really work?" 2006.*

Mak et al. "PLASER: pronunciation learning via automatic speech recognition" 2003.*

Wei. "Online Spoken English Learning System with Intonation Training" Jul. 2006.*

Ramabhadran et al. "The IBM 2007 Speech Transcription System for European Parliamentary Speeches" 2007.*

Witt et al. "Phone-level pronunciation scoring and assessment for interactive language learning" 2000.*

* cited by examiner

METHOD AND SYSTEM FOR ACCENT CORRECTION

BACKGROUND OF THE INVENTION

1. Field of the Invention

This invention relates generally behavior modification, and more particularly to a system, article, and method for utilizing automatic technologies to learn and imitate user capabilities for performing tasks, and to provide feedback in order to facilitate task execution improvement.

2. Description of the Related Art

Customer care and technical support centers are increasingly being located in overseas locations to lower operating costs of multi national corporations. In order to enhance customer satisfaction and to ensure an effective service engagement, foreign service personnel are selected for their knowledge and ability to speak with a client in the client's native language. The effectiveness of the service engagement is often determined by the call center attendant's ability to grasp nuances of their customer's language and the ability to lose their own accents. In addition, the globalization of the world's economy increasingly requires people of many nationalities to interact and converse with each other in both verbal and written form. Therefore, communication skills between persons of various nationalities have taken on an increased level of importance.

SUMMARY OF THE INVENTION

Embodiments of the present invention include a method, article, and system for task execution improvement, a first method embodiment includes: generating a baseline model for executing a task; recording a user executing a task; comparing the baseline model to the user's execution of the task; and providing feedback to the user based on the differences in the user's execution and the baseline model.

A second method embodiment provides for accent correction, the method includes: training a first automatic speech recognition system (ASR1) with native speakers in a language; training a second automatic speech recognition system (ASR2) with non-native speakers of the language; receiving a spoken language sample from a user into ASR1 and ASR2 simultaneously; determining whether the received spoken language sample more closely approximates the output of ASR1 or ASR2; and wherein the level of correlation and pattern matching between the received spoken language samples and ASR1 and ASR2 serves as a feedback indicator to the user of their level of improvement.

A third method embodiment provides for language translation improvement, the method includes: generating a baseline translation model in response to a sample text in an originating language; generating a prediction translation model in response to the sample text with expected mistranslations in response to a user's translation sample; comparing the baseline translation model and the second translation model; presenting the user with the mistranslation differences between the baseline and prediction translation models; and wherein the baseline translation is an accurate translation of the originating language into a target language.

An article comprising one or more computer-readable storage media containing instructions that when executed by a computer enables task execution improvement; wherein the method further includes: generating a baseline model for executing a task; recording a user executing a task; comparing the baseline model to the user's execution of the task; and providing feedback to the user based on the differences in the user's execution and the baseline model.

A system for learning and task execution improvement, the system includes: a user dependent imitation machine that learns a user's behaviors, actions and behaviors for carrying out a task; a user independent machine that records accepted behaviors, actions, and techniques for carrying out the task; a comparator in electrical signal communication with the user dependent imitation machine, the user independent machine, and a learning module; wherein the comparator determines differences in recorded actions, behaviors, and techniques between the user dependent imitation machine and the user independent machine; wherein the learning module produces recommendations for correcting the user's behaviors, actions, and techniques for executing the task in response to the differences determined by the comparator; and wherein the learning module provides the recommendations as feedback to the user to improve execution of the task.

TECHNICAL EFFECTS

As a result of the summarized invention, a solution is technically achieved for a method, article, and system for utilizing automatic technologies to learn and imitate user capabilities for performing tasks, and to provide feedback in order to facilitate task execution improvement.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
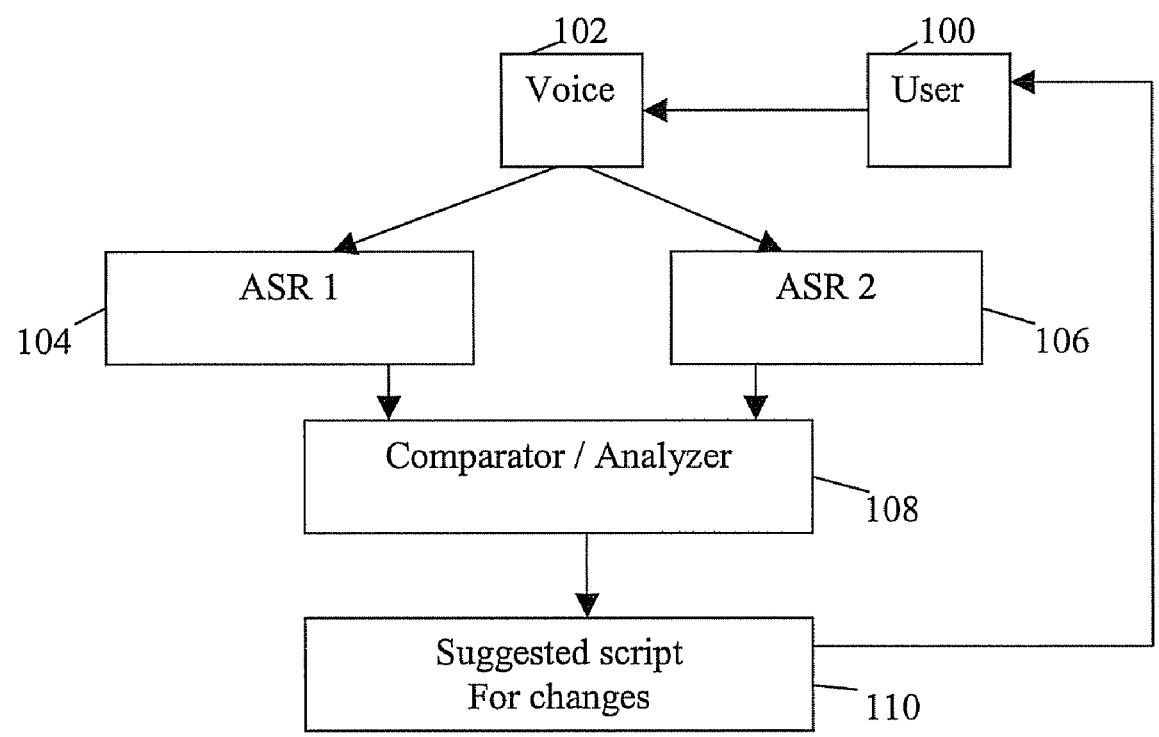
FIG. 1 illustrates a functional block diagram of a process for accent improvement according to embodiments of the invention.

The detailed description explains the preferred embodiments of the invention, together with advantages and features, by way of example with reference to the drawings.

DETAILED DESCRIPTION

Embodiments of the invention provide a method, article, and system that utilize automatic technologies to learn and imitate user capabilities for performing tasks, and to provide feedback in order to facilitate task execution improvement. The automatic technologies compare user actions to a baseline models based on correct and expected user actions, and based on the comparisons the automatic technologies provide the user feedback for learning to correct their actions and improve their capabilities.

In an exemplary embodiment of the invention, users employ automatic technology in the form of automatic speech recognition (ASR) to correct and improve their spoken English language capabilities. In the exemplary embodiment, language pattern differences are tracked to determine the level of errors in speech, by comparing user speech to a model with speech errors, and to an accepted baseline "perfect model" of speech for a given language.

For example, a baseline automatic speech recognition system 1 (ASR 1) trained by native English speakers, and an automatic speech recognition system 2 (ASR 2) trained by non-native English speakers with a particular accent (e.g., Spanish accented English, Russian accented English, etc.) are used to improve a users capabilities in a non-native language. The outputs from ASR 1 and ASR 2 may be phonetic units, words, and phrases and are employed by a user whose primary language is Spanish to improve their accent and syntax to more closely approximate a person whose primary language is English. The user addresses both ASR 1 and ASR 2 simultaneously, and initially the users speech will more closely approximate the non-native English speaker's ASR 2 that provides better word matches to the user speech. However, as the user's speech begins to lose elements related to a Spanish accented English, the user's performance on ASR 2 will degrade, and their performance on ASR 1 will improve. The level of correlation or pattern matching between the two automatic speech recognition systems serves as an indicator to the user of their level of improvement.

Embodiments of the invention may be utilized for training call center personnel who provide service to individuals in other countries. Embodiments of the invention may be offered as a service to call centers to detect incorrect phrases that call center personnel make when responding to phone calls, such as with a heavy accent, and to improve call center personnel pronunciation of words in their non-native language. The service may be offered to the call center personnel on site or remotely over the phone or Internet with voice over Internet protocols (VOIP). The call center would be billed for their time and the number of call center personnel that utilize the service.

Improvement of language translation is a second example of pattern matching in an embodiment of the invention. In an exemplary embodiment, a bilingual Spanish/English speaker utilizes the invention to improve the accuracy of their translating skills from Spanish to English. In the embodiment, a machine translation of a given text sample is customized to match the translation style of a Spanish/English speaker. Statistical analysis may be used to create a predicted translated text with typical mistranslations that would be attributed to the multilingual individual. An existing, highly accurate machine translation program also translates the same text sample from Spanish to English. The two translated text samples are then compared and correlated, and discrepancies in the translated texts are ascribed to the inaccuracies in the translation of the Spanish/English speaker. The differences between the two texts are presented to the Spanish/English speaker, to facilitate the improvement of their language translation skills. The Spanish/English speaker may then create additional Spanish/English translations to repeat the process and to gauge their level of improvement. As the translation abilities of the Spanish/English speaker improves, the level of correlation between text samples will increase, and the number of differences in the translated texts provided by the translation of the Spanish/English speaker and the machine translation will decline.

In the translation example embodiment, a statistical machine is taught to learn to imitate users mistakes and produce a set of possible user mistakes artificially (by applying the user adapted translation machine to an original text and translating it to a different language with imitation of user mistakes). However, for accent detection and improvement, the errors attributed to accents are real (produced by a real person and not by imitating them with a computing device trained by the user).

FIG. 1 illustrates a functional block diagram of a process for accent improvement according to embodiments of the invention. A user (block 100) speaks simultaneously (block 102) to a baseline automatic speech recognition system 1 (ASR 1) (block 104) trained by native language speakers, and an automatic speech recognition system 2 (ASR 2) (block 106) trained by non-native language speakers with a particular accent (e.g., Spanish accented English, Russian accented English, etc.). A comparator 108 analyzes the users (block 100) performance in relation to the two speech recognition systems, and provides the level of correlation between the user's (block 100) speech input to each of the automatic speech recognition systems (ASR 1 (block 104) and ASR 2 (block 106)). Feedback in the form of suggested changes and corrections (block 110) are then provided to the user. Initially, the user's speech will more closely approximate the non-native speaker's ASR 2 that provides better word matches to the user's speech (higher level of correlation). However, as the user's speech begins to lose elements related to their accented speech of a particular language, the user's performance on ASR 2 will degrade (lower level of correlation), and their performance on ASR 1 will improve (higher level of correlation). The level of correlation or pattern matching between the two automatic speech recognition systems, and the number and types of differences to accepted speech patterns for a particular language serve as an indicator to the user of their level of improvement (block 110). For example, differences in phonetic pronunciations in phrases are recorded and presented to the user. The user continues to repeat the process until they achieve their desired level of improvement with respect to eliminating the foreign accent for a particular language from their speech.

Figure 2:
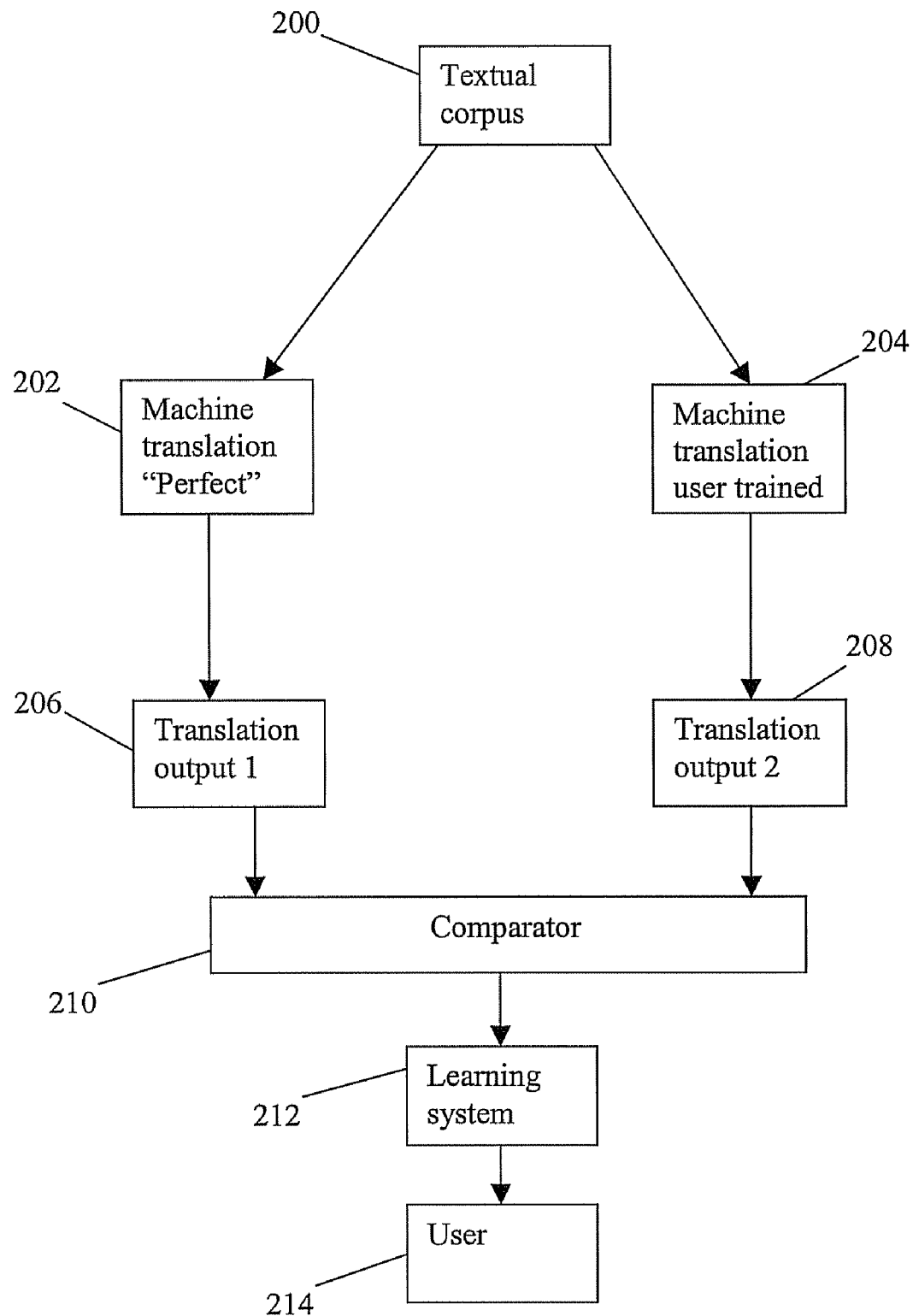
FIG. 2 illustrates a functional block diagram of a process for improving user translations according to embodiments of the invention.

FIG. 2 illustrates a functional block diagram of a process for improving user translations according to embodiments of the invention. A textual corpus (block 200) in a given language that requires translation is supplied to a machine translator (block 202) that provides "perfect" translations and a translation output 1 (block 206) is provided. The textual corpus (block 200) is also supplied to a machine translator (block 204) that is trained to imitate the translation abilities of a user who wants to improve their translation skills. The user trained translator machine (block 204) provides a translated output 2 (block 208) that mimics the user's translation abilities based on statistical and observational analysis of the users translation skills. Both translation outputs (blocks 206 and 208) are supplied to a comparator (block 210). If the comparator (block 210) finds differences in the translations, the translation differences are supplied to a learning system (block 212). The learning system (block 212) explains the differences to the user (block 214) to assist in improving their translation skills.

Figure 3:
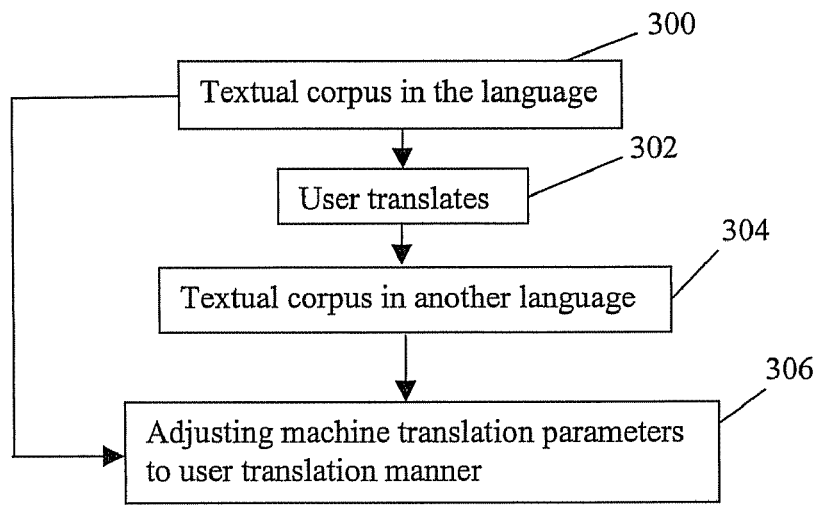
FIG. 3 illustrates user training of a machine translator of FIG. 2, according to embodiments of the invention.

FIG. 3 illustrates user training of a machine translator (block 204) of FIG. 2, according to embodiments of the invention. Block 300 denotes an originating textual corpus of a language, for example Russian. In block 302, the user manually translates the originating textual corpus of block 300 into some other language, for example English, and creates a textual corpus in the other language (block 304) during this translation process. Both the originating textual corpus from block 300 and the manually translated corpus (block 304) are inputted into block 306, where the machine translation parameters are adjusted to correspond to aspects of the manual user translation. In block 306, a comparison of a machine translation to the user's manual translation of the textual corpus is made, and adjustments to the machine translation parameters are made, so that machine translation translates exactly like the user. For example, the machine translation system will write "a" instead of "the."

Figure 4:
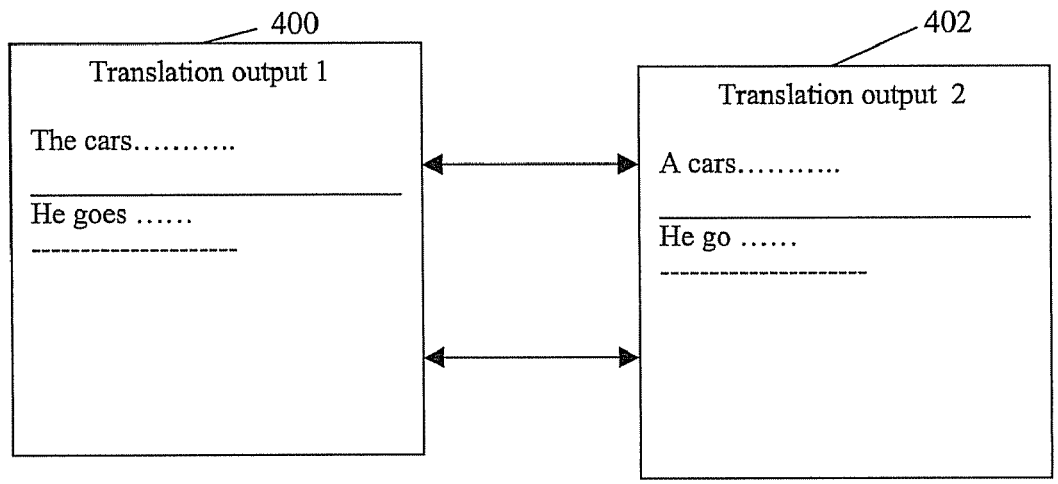
FIG. 4 illustrates the operation of a comparator of FIG. 2 according to embodiments of the invention.
Figure 4:
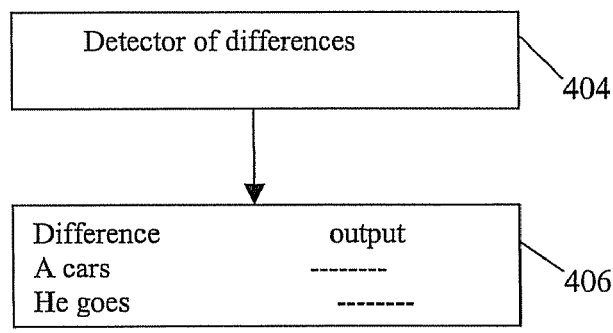

FIG. 4 illustrates the operation of a comparator (block 210) of FIG. 2 according to embodiments of the invention. Block 400 is an example text of translation output 1 (Block 206) from the "perfect" machine translation (block 202), while block 402 is an example text of translation output 2 (block 208) from the user trained machine translation (block 204) that are supplied to the comparator (block 210) and represented by Block 404. Block 404 detects differences in translation output 1 and translation output 2, and points out the differences to the user with the learning system (block 212) in block 406, so that the user can see where mistakes where made. In the present example two mistakes appear in the user translation text "A cars", and "He goes".

Figure 5:
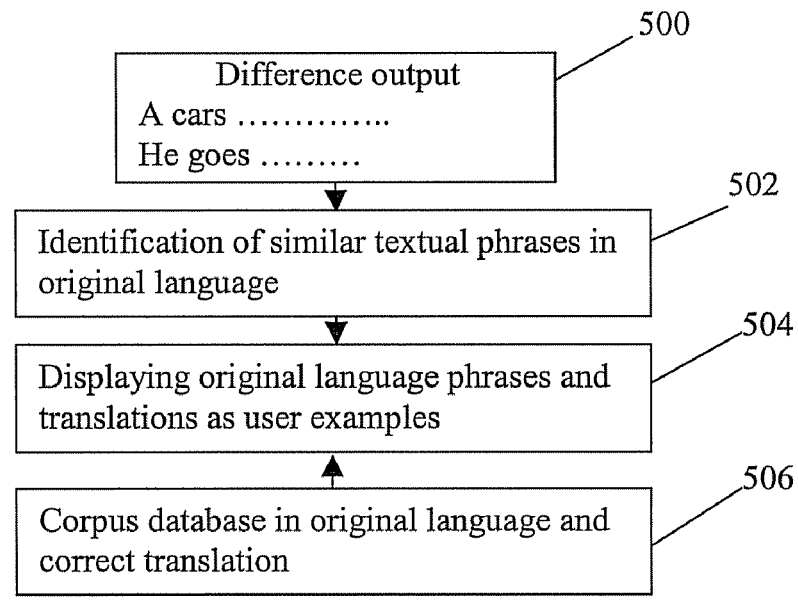
FIG. 5 illustrates the operation of a learning system of FIG. 2 according to embodiments of the invention.

FIG. 5 illustrates the operation of a learning system (block 212) of FIG. 2 according to embodiments of the invention. Block 500 displays the text differences between translation output 1 (block 206) and translation output (block 208). Block 502 identifies phrases in the originating language (in this example the Russian language) where the user frequently makes mistakes, and identifies places where the learning system predicts the user would make a mistake if the user were translating. In block 504, the original language phrases and translation are shown to the user as examples of how a user translates them, with the original corpus and correct translation (block 506).

Figure 6:
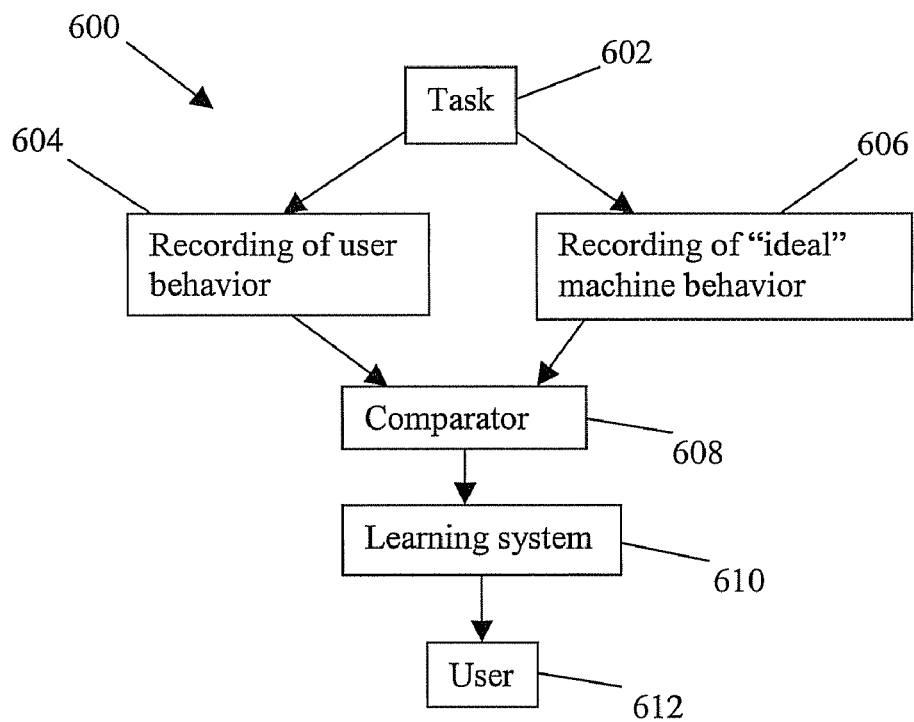
FIG. 6 illustrates a system for the extension of the learning capability process to additional activities and tasks according to embodiments of the invention.

FIG. 6 illustrates a system 600 for the extension of the learning capability process to additional activities and tasks according to embodiments of the invention. The learning capability process for translation and accent improvement shown in the previous embodiments may be generalized to other learning activities. Block 602 denotes various tasks, for example dance, or writing for capability skills improvement. Block 604 denotes a machine that imitates user behavior. The imitation machine (block 604) translates exactly as the user translates, or captures dance moves exactly as the user dances. Whereas, block 606 represents a machine that records ideal behavior, actions and techniques for carrying out tasks, for example a perfect machine translation system or perfect dance steps. Block 608 compares differences between the user dependent imitation machine (block 604) and the machine that shows ideal execution of tasks (block 606). Block 610 is a learning system that produces recommendations for correcting user techniques and behaviors for executing tasks, based on the differences between the user machine dependent machine (block 604) and the ideal behavior machine (block 606). The learning module (block 610) provides recommendations to the user (block 612).

Figure 7:
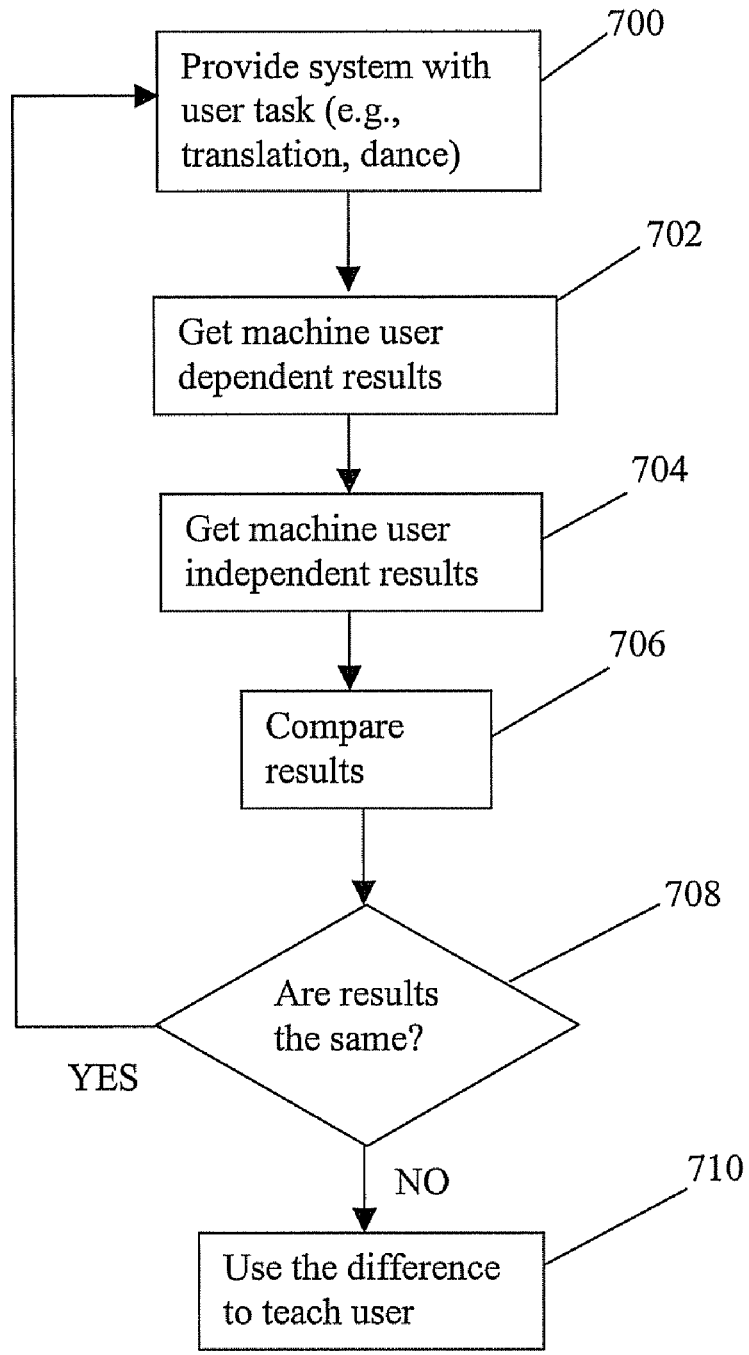
FIG. 7 is a functional block diagram of a system of FIG. 6 according to embodiments of the invention.

FIG. 7 is a functional block diagram of the system (block 600) of FIG. 6 according to embodiments of the invention. The system (block 600) is provided with a user task (block 700), and the system (block 600) retrieves task results from the user dependent imitation machine (block 604) at block 702. The system also retrieves task information from the machine that shows "ideal" execution of tasks (user independent) (block 606) at block 704. The system (block 600) utilizes comparator (block 608) to compare the retrieved task information from the user dependent imitation machine (block 702), and the user independent "ideal" task execution machine (block 704). If the comparator (block 608) does not find differences (decision block 708 is Yes) the task process continues at block 700. If the comparator does find differences (decision block 708 is No), the differences are supplied to the learning module (block 610) to teach the user areas for improvement in carrying out the task.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for accent correction, the method comprising:
training a first automatic speech recognition system (ASR1) with native speakers in a language;
training a second automatic speech recognition system (ASR2) with non-native speakers of the language;
receiving a spoken language sample from a user into ASR1 and ASR2 simultaneously, wherein the user was not one of the native speakers and the user was not one of the non-native speakers;
determining whether the received spoken language sample more closely approximates the output of ASR1 or ASR2; and
providing a feedback indicator to the user representative of their level of accent improvement, wherein the feedback indicator is based on a level of correlation and pattern matching between the received spoken language samples and ASR1 and ASR2.

2. The method of claim 1, wherein the output from ASR1 and ASR2 is at least one of phonetic units, words, or phrases.

3. The method of claim 1, wherein the accent correction is offered as a pay for use service.

4. The method of claim 3, wherein the pay for use service is available over the Internet.

5. A system for learning and task execution improvement, the system comprising:
a user dependent imitation machine that learns a user's behaviors, actions and behaviors for carrying out a task;
a user independent machine that records defined and accepted behaviors, actions, and techniques for carrying out the task;
a comparator in electrical signal communication with the user dependent imitation machine, the user independent machine, and a learning module;

wherein the comparator determines differences in recorded actions, behaviors, and techniques between the user dependent imitation machine and the user independent machine;

wherein the learning module produces recommendations for correcting the user's behaviors, actions, and techniques for executing the task in response to the differences determined by the comparator; and wherein the learning module provides the recommendations as feedback to the user to improve execution of the task;

wherein the task is user accent correction;

wherein the user dependent imitation machine is a first automatic speech recognition system (ASR1) trained by non-native speakers in a language;

wherein the user independent machine is a second automatic speech recognition system (ASR2) trained with native speakers of the language, wherein the user was not one of the native speakers and the user was not one of the non-native speakers;

wherein the system:

receives a spoken language sample from a user into ASR1 and ASR2 simultaneously;

determines whether the received spoken language sample more closely approximates the output of ASR1 or ASR2; and provides a feedback indicator to the user representative of their level of accent improvement from the learning module, wherein the feedback indicator is based on a level of correlation and pattern matching between the received spoken language samples and ASR1 and ASR2.

6. The system of claim 5, wherein the output from ASR1 and ASR2 is at least one of phonetic units, words, or phrases.

7. The system of claim 5, wherein the accent correction is offered as a pay for use service.

8. The system of claim 7, wherein the pay for use service is available over the Internet.

* * * * *